US006464216B2

(12) United States Patent
Weaver et al.

(10) Patent No.: US 6,464,216 B2
(45) Date of Patent: Oct. 15, 2002

(54) VISE JAWS FOR CLAMPING WORKPIECES AT AN ANGLE

(75) Inventors: Brian K. Weaver, Street; Joseph V. Marshall, Jr., Fallston, both of MD (US)

(73) Assignee: Diversified Machining, Inc., Forest Hill, MD (US)

( * ) Notice: Subject to any disclaimer, the term of this patent is extended or adjusted under 35 U.S.C. 154(b) by 0 days.

(21) Appl. No.: 09/767,385

(22) Filed: Jan. 23, 2001

(65) Prior Publication Data

US 2002/0096813 A1 Jul. 25, 2002

(51) Int. Cl.[7] ........ B23Q 1/04

(52) U.S. Cl. ........ 269/282

(58) Field of Search ........ 269/282, 283, 269/258, 279, 280, 277, 266, 261, 262; 33/536, 537

(56) References Cited

U.S. PATENT DOCUMENTS

| | | | | |
|---|---|---|---|---|
| 814,366 A | | 3/1906 | Fertig et al. | |
| 2,284,449 A | | 5/1942 | Rodess | |
| 2,676,414 A | | 4/1954 | Derry | |
| 2,881,667 A | | 4/1959 | Ebert | |
| 3,192,636 A | * | 7/1965 | Stimetz | 33/537 |
| 3,958,335 A | | 5/1976 | Arnold et al. | |
| 4,022,454 A | * | 5/1977 | Bredvik | 269/258 |
| 4,315,373 A | | 2/1982 | Lenz | |
| 4,383,682 A | | 5/1983 | Feinberg | |
| 4,863,151 A | | 9/1989 | Justesen | |
| 4,898,371 A | * | 2/1990 | Mills et al. | 269/280 |
| 4,953,840 A | | 9/1990 | Nishimura | |
| 4,969,637 A | | 11/1990 | Nishimura | |
| 5,163,664 A | | 11/1992 | Calaio | |
| 5,419,540 A | | 5/1995 | Teafatiller | |

* cited by examiner

*Primary Examiner*—Robert C. Watson
(74) *Attorney, Agent, or Firm*—Robert M. Gamson; Leonard Bloom

(57) ABSTRACT

A vise having a pair of vise jaws for clamping a workpiece. A rotatable protractor is provided in one of the vise jaws. A platform is carried by the protractor which extends beyond the vise jaw to support a workpiece. Worm drive gearing between the protractor and a manually-manipulable worm provides for rotating the protractor and the platform to a desired rotational position. A removable member may be connected to the platform. An adapter may be received on the platform to support the workpiece.

11 Claims, 8 Drawing Sheets

VISE JAWS FOR CLAMPING WORKPIECES AT AN ANGLE

FIELD OF THE INVENTION

The present invention relates to a vise jaw for clamping a workpiece and, more particularly to vise jaws for clamping the workpiece at a selected angle by manually manipulable means.

DESCRIPTION OF RELATED ART

Vises to hold workpieces are well known. With most of these known vises, in order to hold the workpiece at a desired angle with respect to a cutting tool, the operator must loosen the workpiece in the jaws of the vise and adjust the workpiece at a desired angle using an angle measurement device. This is a time consuming procedure and frequently does not provide the desired angle because of slippage or difficulty in using the measurement device with the vise. In U.S. Pat. No. 814,366, Fertig et al disclose a micrometer mechanism with a worm and screw to adjust a work holding plate. Rodess, in U.S. Pat. No. 2,284,449 discloses a vise jaw attachment. Derry, in U.S. Pat. No. 2,676,414 discloses an angle computer for use by machinists. In U.S. Pat. No. 2,881,667, Ebert discloses a universal vise having indexing means. Arnold et al in U.S. Pat. No. 3,958,335 disclose an example of an angle setting mechanism for vises mounted on the table of a machine tool. The device is set to a preselected angle with respect to the table and the vise is then aligned with respect to the angle setting mechanism. In U.S. Pat. No. 4,315,373, Lenz discloses a machine vise protractor installed on the base of the vise to permit rotating the vise while the vise is mounted on a table. In U.S. Pat. No. 4,383,682 Feinberg discloses a vise jaw assembly for holding a workpiece in relation to a cutting tool such as in a milling machine. It includes a rotatable or inclinable platform for supporting the workpiece at a selected angle precisely controlled by an indexed rotator protruding through a window on the top surface of the jaw and connected to the platform by means of a shaft extending beyond the base of the jaw toward the opposing jaw. Justesen in U.S. Pat. No. 4,863,151 discloses a vise jig tool having a jaw face to which is attached a graduated scale to permit an operator to set the angle of the work guide and fastener for securing said work guide at the proper angle on the elongated jaw member. Nishimura in U.S. Pat. No. 4,953,840 discloses a work-holding vise jig to be attached to the jaw of a vise and in U.S. Pat. No. 4,969,637 discloses a holder body attached removably to a fixed jaw of a vise. In U.S. Pat. No. 5,163,664, Calaio discloses an alignment tool for a machine vise to orient a workpiece for machining. It uses a protractor to support a workpiece when the workpiece is between the jaws. Teafatiller in U.S. Pat. No. 5,419,540 discloses a workpiece support for use in a machine tool vise. A multiple series of arcuately-spaced bores are in blocks attached to a jaw of the vise and multiple pins in the bores support a workpiece support member.

Despite all of the effort in this field indicative of the need, none of the devices provide a simple and easily used device to accurately position and hold a workpiece in a vise.

BRIEF SUMMARY OF THE INVENTION

It is an object of the present invention to provide a tool in which a workpiece is positioned quickly, easily and accurately in the jaws of a vise.

It is a further object of the present invention to provide a tool which positions a workpiece at a desired angular position and which is reproducible within minutes of a degree.

In accordance with the teachings of the present invention, there is disclosed a vise having a pair of vise jaws for clamping a workpiece therebetween. At least one of the vise jaws is provided with a rotatable protractor. The one vise jaw has an external surface. A platform is carried by the protractor and extends beyond the one vise jaw for supporting the workpiece thereon at a desired angle between the vise jaws. A manually-manipulable means is accessible through an opening in the external surface of the one vise jaw. Gearing means are provided within the one vise jaw and connected between the manually-manipulable means and the protractor, such that the protractor may be conveniently rotated to a desired angular position.

In further accordance with the teachings of the present invention, there is disclosed a vise having a pair of vise jaws movable relative to each other for clamping a workpiece therebetween. A protractor is carried by one of the vise jaws and rotatably journaled therein. A platform is carried by the protractor and extends beyond the one vise jaw for supporting the workpiece thereon at a desired angular position. A worm wheel is disposed within the one vise jaw and is connected to the protractor for rotation in unison. A worm engages the worm wheel. The worm is rotatably mounted within the one vise jaw and externally accessible through an opening formed on a top surface of the one vise jaw for rotating the protractor to the desired angular position.

Still further in accordance with the teachings of the present invention there is disclosed a vise having a pair of vise jaws, at least one of which is movable for clamping a workpiece therebetween. A protractor is carried by the one movable vise jaw and is rotatably journaled therein. A platform is carried by the protractor and extends beyond the one movable vise jaw for supporting the workpiece thereon at a desired angular position. A worm wheel within the one movable vise jaw is connected to the protractor for rotation in unison. A worm engages the worm wheel, the worm being rotatably mounted within the one movable vise jaw and externally accessible through an opening formed on a top surface of the one movable vise jaw for rotating the protractor to the desired angular position. Circumferentially-spaced graduations are disposed around the opening in the top surface of the one movable vise jaw. Means are provided for locking the protractor in the desired angular position. Means are provided to preclude movement of the worm out of the opening in the top surface of the one movable vise jaw.

In yet another aspect, there is disclosed a vise having a pair of vise jaws movable relative to each other for clamping a workpiece therebetween. A protractor is carried by one of the vise jaws and is rotatably journaled therein. A platform is carried by the protractor and extends beyond the one vise jaw for supporting the workpiece thereon at a desired angular position. An adapter has a first end and an opposite second end, each end having a respective stop extending outwardly perpendicular to the adapter. The stops extend at opposite directions from one another. When the adapter is disposed on the platform, one stop engages the platform and retains the adapter on the platform as the platform is rotated with the protractor to the desired angular position. The other stop engages the workpiece which is disposed on the adapter, thereby supporting the workpiece as the workpiece is rotated with the protractor to the desired angular position.

These and other objects of the present invention will become apparent from a reading of the following specification taken in conjunction with the enclosed drawings.

BRIEF DESCRIPTION OF THE DRAWINGS

FIG. 21 shows the two jaws of the vise abutting one another.

FIG. 22 shows the jaws separated revealing the protractor and platform on the first jaw.

FIG. 23 shows the mounting of the removable member on the platform.

FIG. 24 shows the adjusting of the platform with the removable member to the desired angular position.

FIG. 25 shows the locking of the worm.

FIG. 26 shows the adapter disposed on the removable member.

FIG. 27 shows the workpiece disposed on the adapter abutting the stop.

FIG. 28 shows the jaws of the vise holding the workpiece at the desired angular position.

DESCRIPTION OF THE PREFERRED EMBODIMENTS

Figure 1:
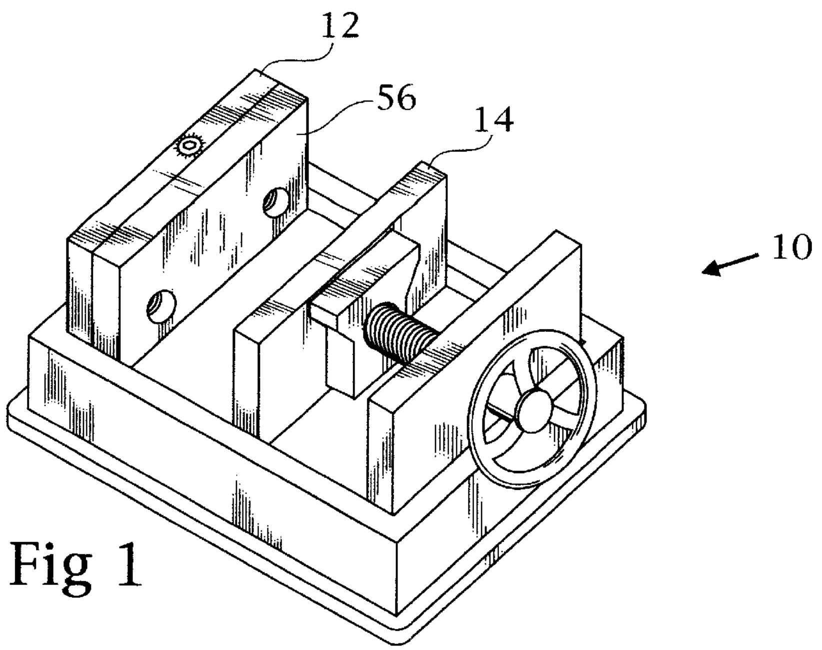
FIG. 1 is a perspective view of the vise of the present invention with the jaws closed.
Figure 2:
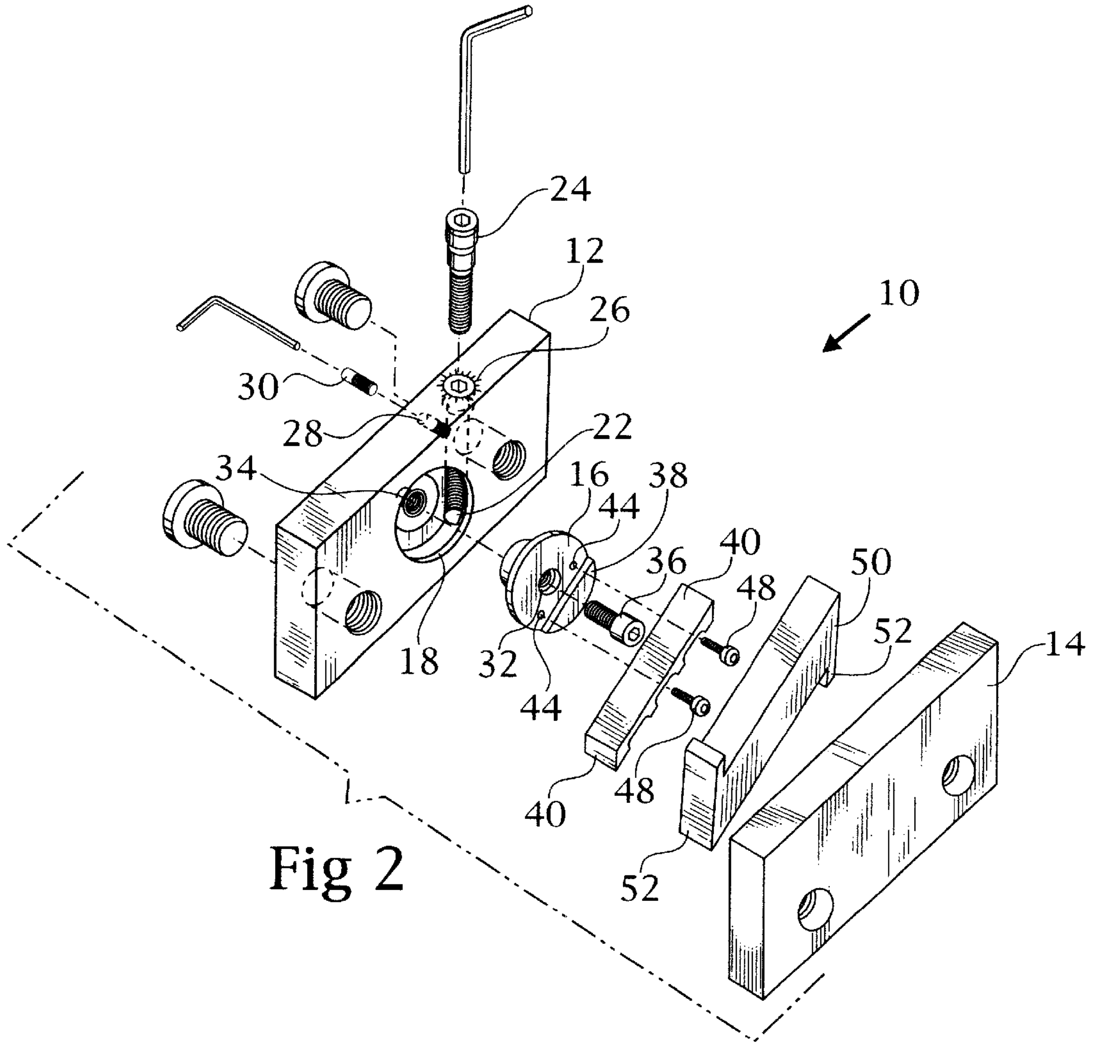
FIG. 2 is an exploded perspective view of the present invention.
Figure 3:
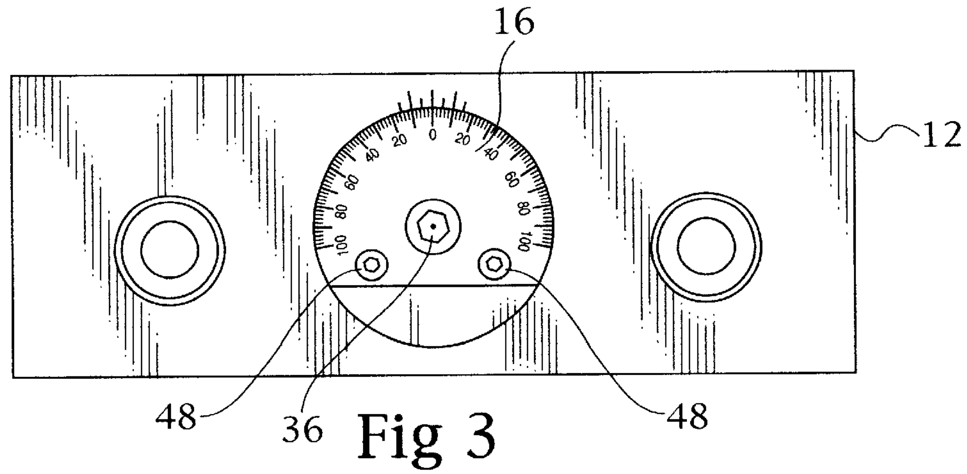
FIG. 3 is an elevational view of the one vise jaw showing the protractor.
Figure 4:
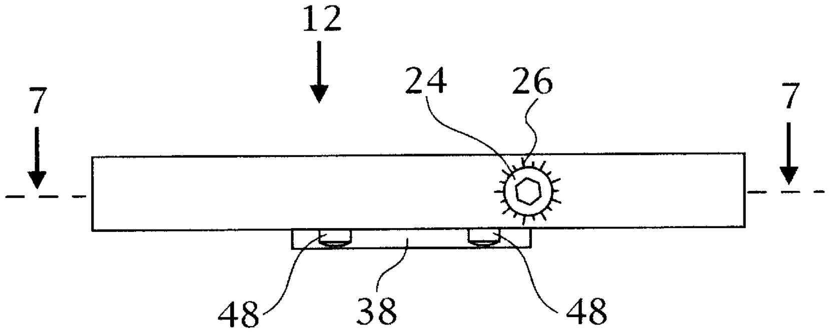
FIG. 4 is a top plan view of FIG. 3.
Figure 5:
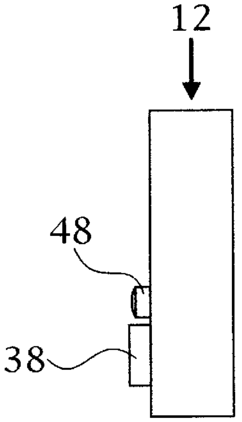
FIG. 5 is an end view of FIG. 3.
Figure 6:
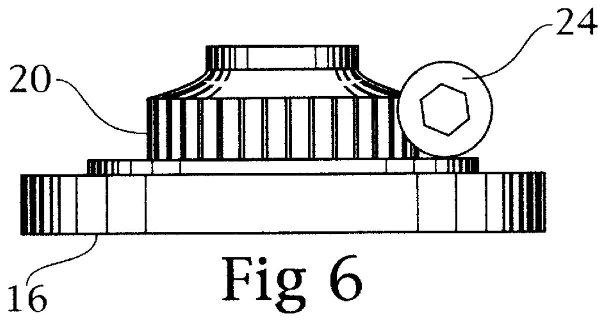
FIG. 6 is a top plan view of the protractor, worm wheel and worm gear removed from the one vise jaw.

Referring now to FIGS. 1 and 2, the present invention is a vise 10 which clamps and holds a workpiece at a desired angle. The invention has a first jaw 12 and a second jaw 14 which are movable with respect to one another. It is preferred that the first jaw 12 be fixed and the second jaw 14 be movable. As shown in FIGS. 3–6, a rotatable protractor 16 is received in a well 18 in the first jaw 12. The face of the protractor 16 has marked thereon indices for indicating the degree of rotation of the protractor. Preferably, the indices have a center marked 0 and have markings for each degree up to 100° on either side of the 0 mark. At least one reference indicator is marked on the face of the first jaw for alignment with the markings on the protractor. Opposite the face of the protractor 16, a worm wheel 20 is formed integral with the protractor, the worm wheel 20 being received in the well 18 in the first jaw 12. The worm wheel 20 moves in unison with the protractor.

Figure 7:
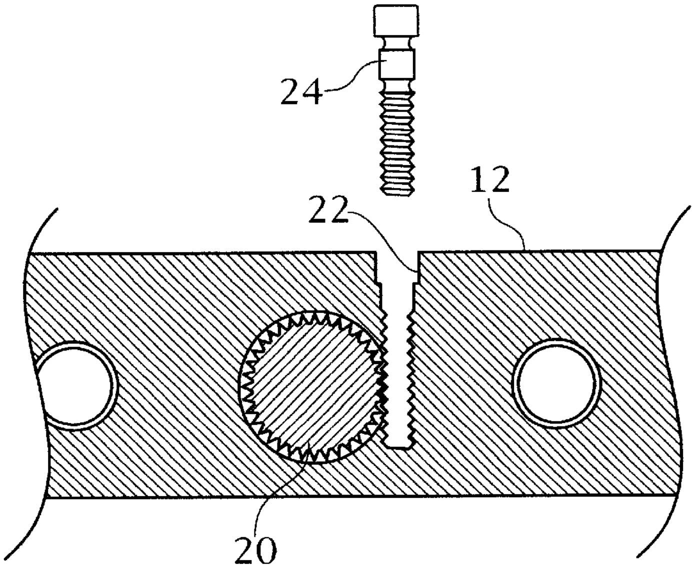
FIG. 7 is a longitudinal section view taken across the lines 7—7 of FIG. 4.
Figure 8:
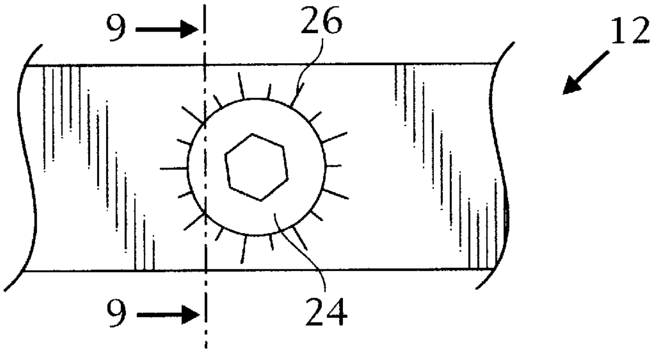
FIG. 8 is an enlarged top plan view of the top of the one vise jaw showing the graduation around the manually manipulable means.
Figure 9:
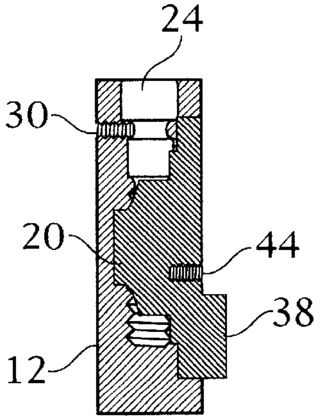
FIG. 9 is a cross section view taken across the lines 9—9 of FIG. 8.

A bore 22 is formed in the first jaw 12, the bore 22 communicating with the opening 18 in the first jaw 12 as shown in FIGS. 7–9. Preferably, the bore is formed in the top surface of the first jaw 12. The bore 22 is threaded and a worm gear 24 is disposed in the bore 22. The worm gear 24 engages the worm wheel 20 on the protractor 16 such that rotation of the worm gear 24 produces concomitant rotation of the protractor 16 as will be explained. Preferably, the head of the worm gear has a manually-manipulable drive means formed therein. The drive means may be a hexagonal socket opening, a slot, or a cross slot but is not so limited. In this manner, the worm gear 24 may be driven by a hex wrench or screwdriver while the head of the worm gear 24 does not protrude above the top surface of the first jaw. A plurality of circumferentially-spaced graduations 26 are formed around the bore 22 on the external surface of the first jaw 12. It is preferred that each graduation represents one-half of a degree of rotation of the protractor 16 when the worm gear 24 drives the protractor 16 (FIG. 8). In this manner, fine adjustment of the workpiece may be achieved as will be explained. A second bore 28 is formed in the first vise jaw 12 which is approximately perpendicular to the bore 22 in which the worm gear 24 is disposed. The second bore 28 is threaded to receive therein a first threaded bolt 30 which is inserted to contact the worm gear 24 and to preclude movement of the worm gear 24 out of the surface of the first vise jaw 12.

A threaded opening 32 is formed in the protractor 16, preferably centrally thereof and a cooperating threaded opening 34 is formed in the first vise jaw centrally in the well 18 in which the protractor 16 is received. The threaded openings 32, 34 are aligned and a second threaded bolt 36 is disposed in the threaded openings 32, 34 to lock the protractor 16 in the desired angular position.

Figure 10:
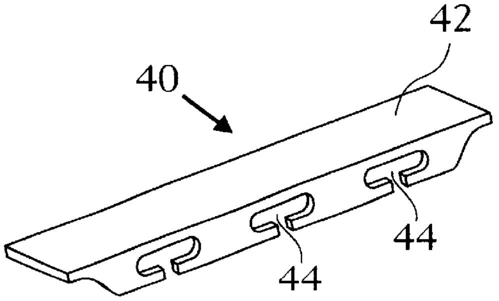
FIG. 10 is a perspective view of a removable member which is received on the platform.
Figure 11:
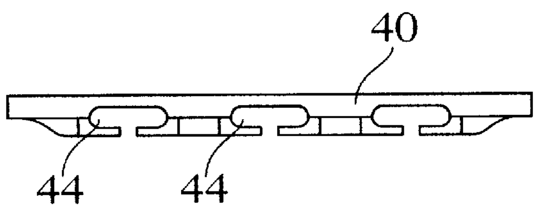
FIG. 11 is a side elevation view of the removable member.
Figure 12:
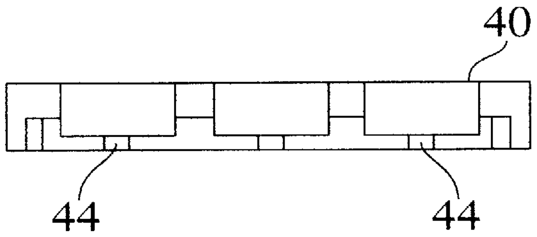
FIG. 12 is a bottom planar view of the removable member.
Figure 13:
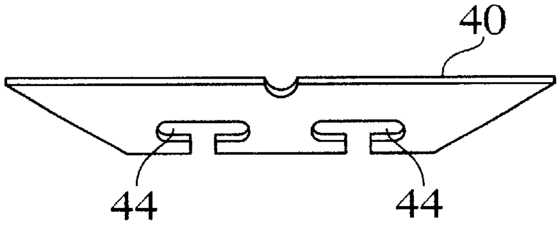
FIG. 13 is a perspective view of an alternate embodiment of the removable member.

A platform 38 is formed on the face of the protractor 16. Preferably, the platform 38 is a chordal section formed below the indices marked on the face of the protractor 16 and projecting outwardly from the face of the protractor 16 (FIGS. 2–5). The workpiece is supported on the platform. If the workpiece is large, it may be desirable to enlarge the platform 38 by disposing a removable member 40 on the platform 38. The removable member 40 may be of any desired shape and may be retained on the platform 38 by any desired means. In a preferred embodiment (FIGS. 10–12), the removable member 40 has a flat top surface 42 and at least two slotted openings 44 are formed in the lower portion of the removable member 40. Two spaced-apart threaded bores 46 are formed in the face of the protractor 16 between the top of the platform 38 and the indices on the face of the protractor 16. A pair of cooperating threaded bolts 48 are disposed in the slotted openings 44 in the removable member 40 and received in the threaded bores 46 in the face of the protractor such that the removable member 40 rests on the platform 38. The heads of the bolts 48 are tightened against the removable member 40 after the removable member 40 is adjusted in the slotted opening to a desired position. The larger workpiece may then be supported on the top surface 42 of the removable member 40. The size and shape of the removable member is not critical but may be formed to accommodate the workpiece (FIG. 13).

Figure 14:
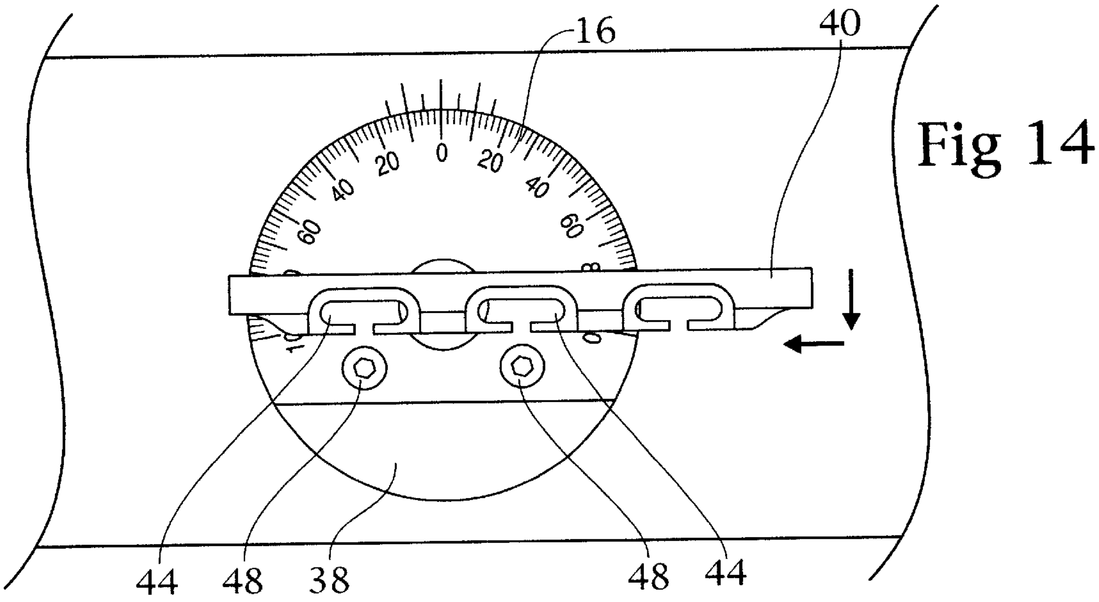
FIG. 14 is a plan view showing the movable member being placed on the platform on the protractor.
Figure 15:
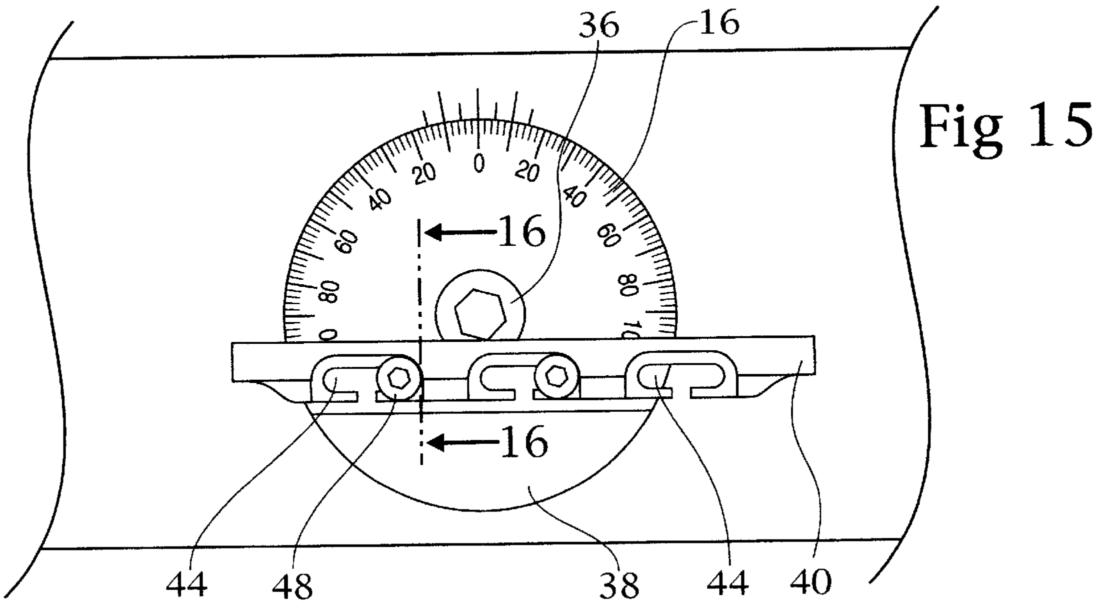
FIG. 15 is a plan view showing the bolts on the protractor received in the slotted openings in the removable member and the removable member moved to engage the bolts.
Figure 16:
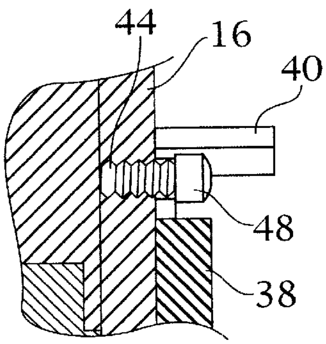
FIG. 16 is a section view along the lines 16—16 of FIG. 15.

As shown in FIGS. 14–16, the threaded bolts 48 are backed out to insert the heads of the bolts 48 into the slotted openings 44 in the removable member 40. The removable member 40 is moved sideways to secure the heads of the bolts 48 and the bolts 48 are tightened to retain the removable member 40 abutting the platform 38 on the protractor 16.

Figure 17:
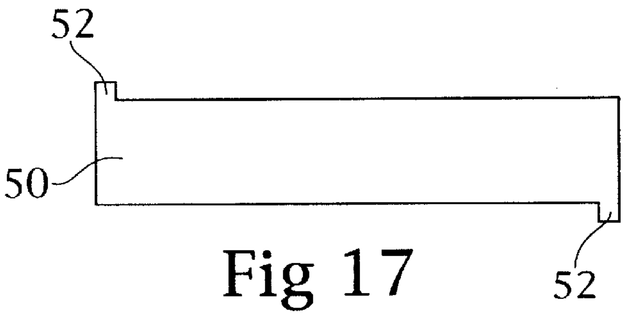
FIG. 17 is a side elevation view of the adapter.
Figure 18:
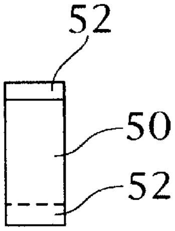
FIG. 18 is an end view of the adapter.
Figure 19:
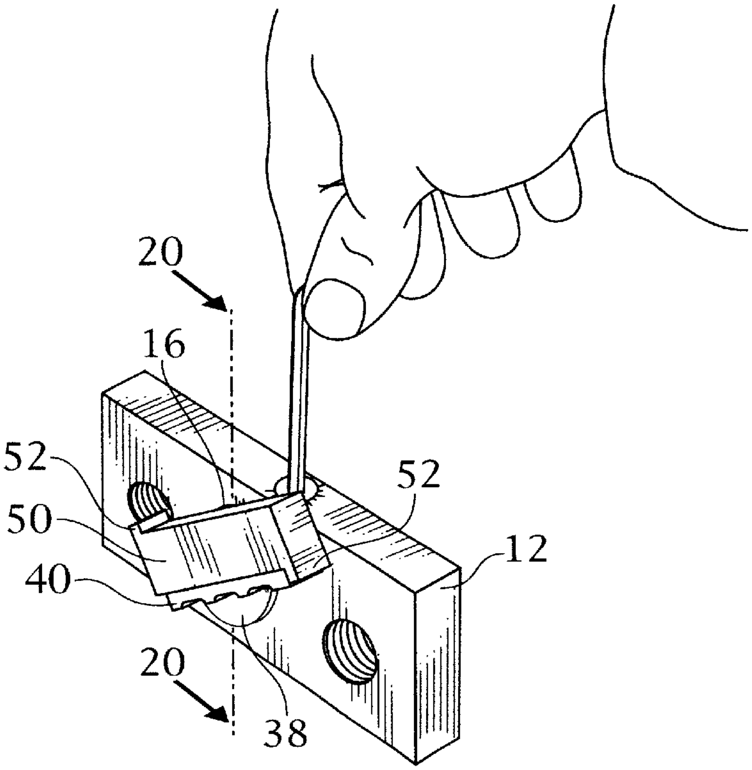
FIG. 19 is a perspective view of the adapter disposed on the removable member on the platform being adjusted to a desired angular position.
Figure 20:
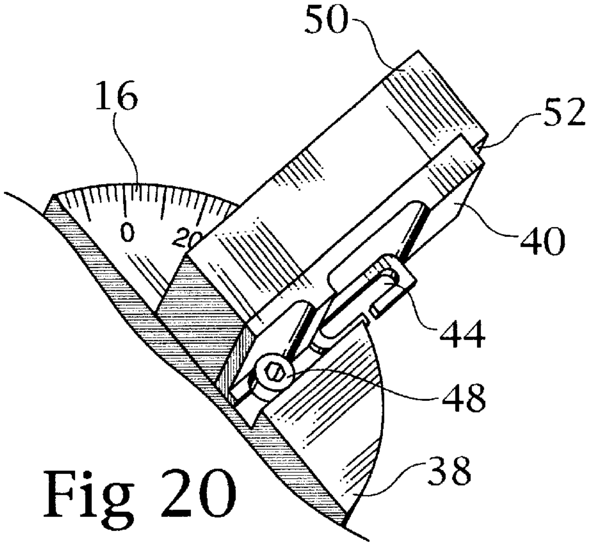
FIG. 20 is an enlarged sectional view taken across the lines 20—20 of FIG. 19.
Figure 21:
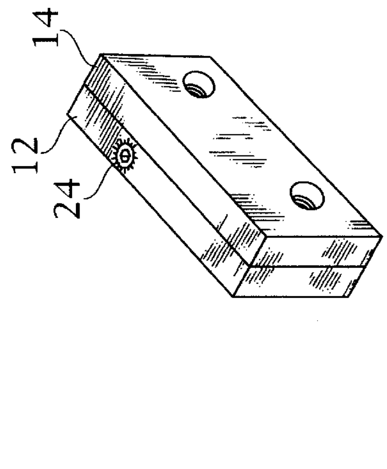
FIGS. 21–28 are a sequence of perspective views showing operation of the present invention.

It is further preferred that an adapter 50 (FIGS. 17–18) be disposed on the platform 38 or on the removable member 40 (FIGS. 19–20). The adapter 50 is a parallelepiped having a first end and an opposite second end. A respective stop 52 is formed on each end projecting outwardly perpendicular to the adapter 50. The stops 52 extend in opposite directions from one another. In this manner, when the adapter 50 is disposed on the platform 38 (or on the removable member 40), one stop engages the platform 38 and retains the adapter 50 on the platform 38 as the platform 38 is rotated to the desired angular position. The workpiece is placed on the adapter 50 and the other stop 52 engages the workpiece and supports the workpiece as the workpiece is rotated with the protractor 16 to the desired angular position.

FIGS. 21–28 show the sequence of operation of the present invention.

Figure 22:
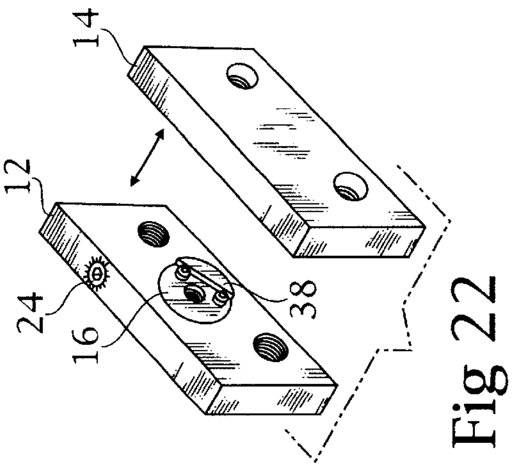
Figure 23:
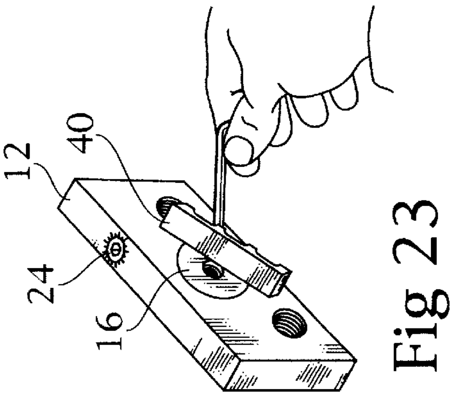
Figure 24:
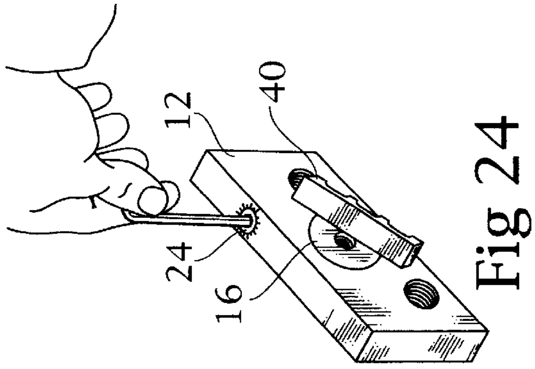
Figure 25:
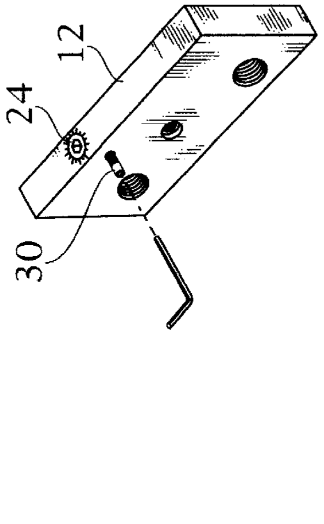
Figure 26:
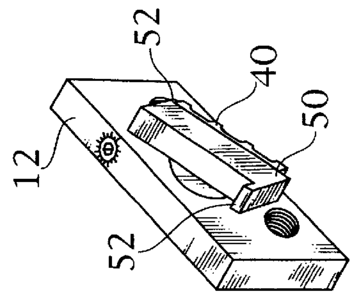
Figure 27:
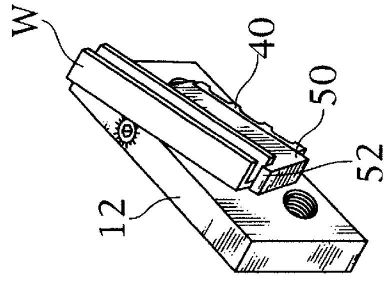
Figure 28:
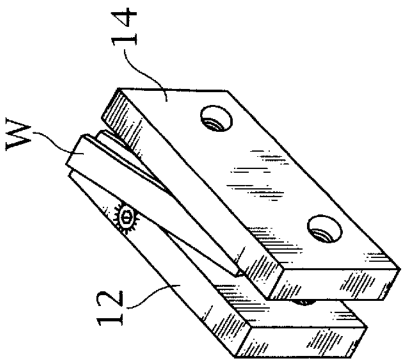

FIG. 22 shows the jaws 12, 14 moved apart a sufficient distance so that the removable member 40, the adapter 50 and the workpiece W can be mounted. In FIG. 23 the removable member 40 is attached to the platform by tightening the bolts 48 as discussed above. The desired angular position of the platform is finely adjusted to the desired one-half degree of rotation by turning of the worm gear 24 as shown in FIG. 24. The worm gear 24 is locked in place as shown in FIG. 25 by turning the first threaded bolt 30. In FIG. 26 the adapter 50 is disposed on the removable member 40 with one of the stops 52 engaging the removable member 40 so the adapter does not slide off of the removable member 40. The workpiece W is placed on the adapter 50 such that the workpiece W rests against, and is supported by, the other stop 52 on the adapter as shown in FIG. 27. The second jaw 14 is then moved to clamp the workpiece W between the two jaws 12, 14 at the desired angular position as in FIG. 28.

Figure 29:
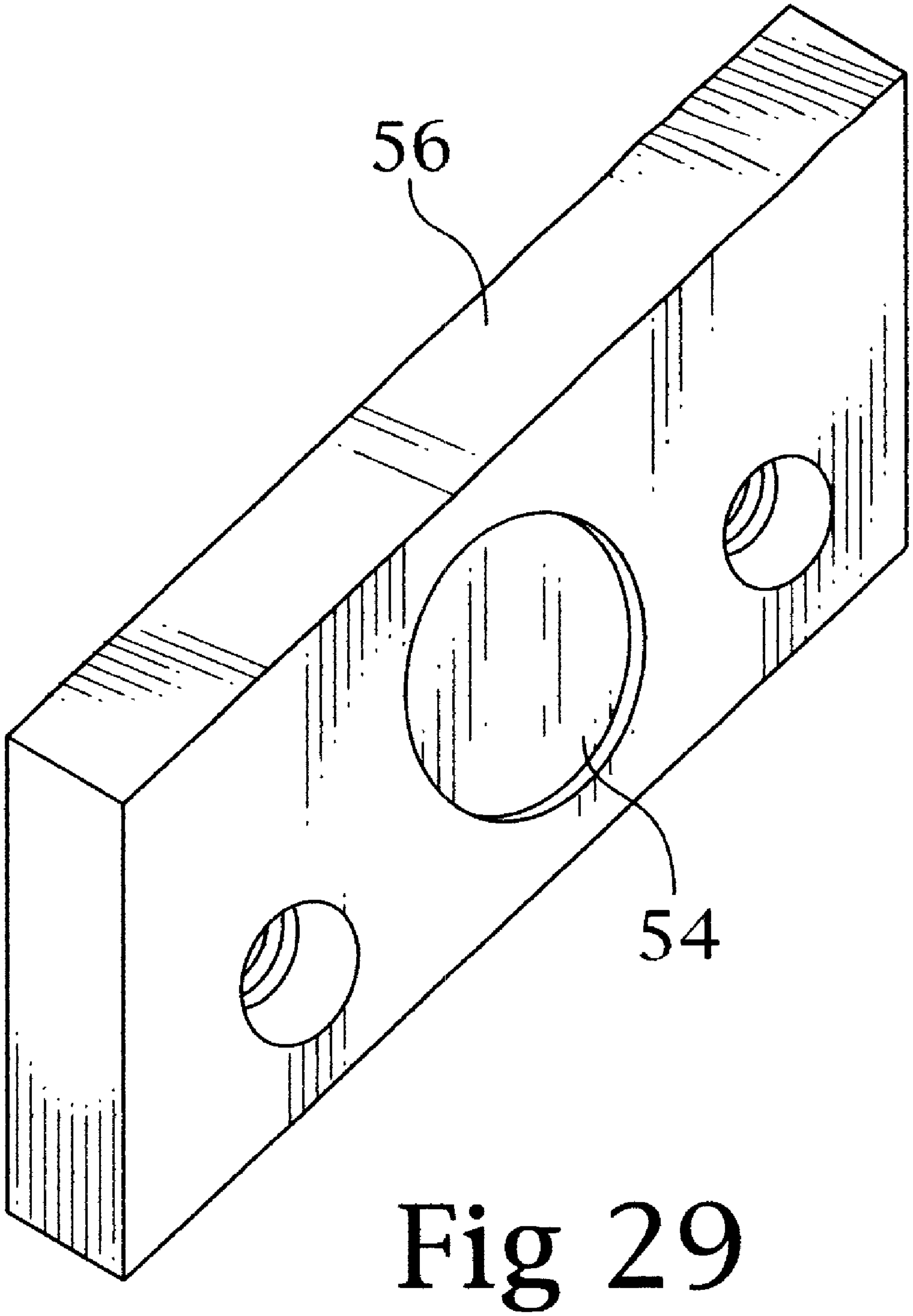
FIG. 29 is a perspective view of the face of the second jaw showing a recess formed therein.

A recess 54 in the face of a removable third jaw 56 is shown in FIG. 29. The recess 54 receives therein the protractor 16 with the projecting platform 28 and the heads of the threaded bolts 48 without damage. The third jaw also has two spaced-apart threaded openings therein such that the third jaw 56 can be connected to the first jaw 12 which has two corresponding threaded openings in which bolts may be threadingly inserted. This locks the two jaws 12, 56 together so that the two jaws 12, 56 may act as a single jaw. In this manner, the vise 10 serves as a conventional vise which can clamp a workpiece between the second jaw 14 and the reverse face of the third jaw 56 which has been connected to the first jaw 12 (FIG. 1).

It is preferred that the jaws 12, 14, 56 be formed from case-hardened steel.

In summary, the present invention is a tool for machining angles, drilling angular holes and machining of compound angles, built right into the vise jaw. The workpiece is positioned quickly, easily and accurately. The tool is accurate and reproducible to within minutes of a degree. The tool can be used as a standard vise jaw providing even more convenience.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. In a vise having a pair of vise jaws for clamping a workpiece therebetween, at least one of the vise jaws being provided with a rotatable protractor, the one vise jaw having an external surface, a platform carried by the protractor and extending beyond the one vise jaw for supporting the workpiece thereon at a desired angle between the vise jaws, the improvement comprising a manually-manipulable means accessible through an opening in the external surface of the one vise jaw, and gearing means within the one vise jaw and connected between the manually-manipulable means and the protractor, such that the protractor may be conveniently rotated to a desired angular position, wherein the gearing means comprises a worm drive gearing between the protractor and the manually-manipulable means, wherein the worm drive gearing comprises a worm wheel carried by the protractor for rotation in unison, and a worm gear formed on the manually-manipulable means and engaging the worm wheel, further including means to retain the manually-manipulable means within the opening on the top surface of the one vise jaw, and wherein the external surface of the one vise jaw comprises a top surface, and wherein the manually-manipulable means has a hexagonal socket formed therein, whereby a hexagonal wrench may be removably inserted in the socket for rotating the worm gear.

2. In a vise having a pair of vise jaws for clamping a workpiece therebetween, at least one of the vise jaws being provided with a rotatable protractor, the one vise jaw having an external surface, a platform carried by the protractor and extending beyond the one vise jaw for supporting the workpiece thereon at a desired angle between the vise jaws, the improvement comprising a manually-manipulable means accessible through an opening in the external surface of the one vise jaw, and gearing means within the one vise jaw and connected between the manually-mamipulable means and the protractor, such that the protractor may be conveniently rotated to a desired angular position, further comprising an adapter having a first end and an opposite second end, each end having a respective stop extending outwardly perpendicular to the adapter, the stops extending in opposite directions from one another, wherein when the adapter is disposed on the platform, one stop engages the platform and retains the adapter on the platform as the platform is rotated with the protractor to the desired angular position and the other stop engages the workpiece which is disposed on the adapter, thereby supporting the workpiece as the workpiece is rotated with the protractor to the desired angular position.

3. The improvement of claim 2, wherein the platform is a chordal section formed on the protractor.

4. In a vise having a pair of vise jaws for clamping a workpiece therebetween, at least one of the vise jaws being provided with a rotatable protractor, the one vise jaw having an external surface, a platform carried by the protractor and extending beyond the one vise jaw for supporting the workpiece thereon at a desired angle between the vise jaws, the improvement comprising a manually-manipulable means accessible through an opening in the external surface of the one vise jaw, and gearing means within the one vise jaw and connected between the manually-manipulable means and the protractor, such that the protractor may be conveniently rotated to a desired angular position, wherein a removable member is mounted on the platform to enlarge the platform.

5. The improvement of claim 4, wherein at least one bolt is threadably engaged in the protractor immediately above the platform, the removable member having at least one opening therein to receive the at least one bolt to secure the removable member to the protractor.

6. In a vise having a pair of vise jaws for clamping a workpiece therebetween, at least one of the vise jaws being provided with a rotatable protractor, the one vise jaw having an external surface, a platform carried by the protractor and extending beyond the one vise jaw for supporting the workpiece thereon at a desired angle between the vise jaws, the improvement comprising a manually-manipulable means accessible through an opening in the external surface of the one vise jaw, and gearing means within the one vise jaw and connected between the manually-manipulable means and the protractor, such that the protractor may be conveniently rotated to a desired angular position, further comprising a third vise jaw, the third jaw being removably connected to the one vise jaw and covering the protractor wherein the vise may be used as a conventional vise and the protractor is protected from damage.

7. A vise, comprising a pair of vise jaws movable relative to each other for clamping a workpiece therebetween, a protractor carried by one of the vise jaws and rotatably journaled therein, a platform carried by the protractor and extending beyond the one vise jaw for supporting the workpiece thereon at a desired angular position, an adapter having a first end and an opposite second end, each end having a respective stop extending outwardly perpendicular to the adapter, the stops extending at opposite directions from one another, wherein when the adapter is disposed on the platform, one stop engages the platform and retains the adapter on the platform as the platform is rotated with the protractor to the desired angular position, and the other stop engages the workpiece which is disposed on the adapter, thereby supporting the workpiece as the workpiece is rotated with the protractor to the desired angular position.

8. The vise of claim 7, further comprising a worm wheel within the one vise jaw and connected to the protractor for rotation in unison, a worm engaging the worm wheel, and the worm being rotatably mounted within the one Vise jaw and externally accessible through an opening formed on the top surface of the one vise jaw for rotating the protractor to the desired angular position.

9. The vise of claim 8, further including means to preclude movement of the worm out of the opening in the top surface of the one movable vise jaw.

10. The vise of claim 8, further including circumferentially-spaced graduations around the opening in a top surface of the one vise jaw.

11. The vise of claim 10, wherein each graduation represents one-half of a degree.

* * * * *